Aug. 1, 1967 K. FRANCK ETAL 3,334,219
LUMINAIRE
Filed Dec. 1, 1965 6 Sheets-Sheet 1

INVENTORS
KURT FRANCK
HERBERT A. ODLE
BY
Moses, Nolte & Nolte
ATTORNEYS INVENTORS
KURT FRANCK
HERBERT A. ODLE
BY
Moses, Nolte & Nolte
ATTORNEYS

3,334,219
LUMINAIRE

Kurt Franck and Herbert A. Odle, Newark, Ohio, assignors to Holophane Company, Inc., New York, N.Y., a corporation of Delaware
Filed Dec. 1, 1965, Ser. No. 518,508
21 Claims. (Cl. 240—25)

This application is a continuation-in-part of co-pending application Ser. No. 342,421 filed on Feb. 4, 1964, and is also a continuation-in-part of co-pending application Ser. No. 303,876 filed Aug. 22, 1963, which in turn was a continuation of an application Ser. No. 824,989 filed July 6, 1959, and now abandoned.

The present invention relates to street lighting luminaires and more particularly to a refractor for producing four beam light distribution from a reflector which produces two concentrated beams of light, one on either side of the refractor. More particularly the invention concerns itself with selectively treating light emitted into one or more of the four beams.

Previously, luminaires have been constructed in which light beams are formed from one laterally symmetrical reflected beam and in which the beams are directed into a four directional street intersection. In such cases, the beam from the reflector portion of the luminaire is in the form of a cone and each element of the cone is concentrated by the refractor into an incomplete cone with either two, three or four lobes as the street demands. With the advent of the horizontally positioned mercury lamp, it became desirable to make the reflectors longer and narrower in order to complement the physical shape of the mercury lamp. With this change in reflector shape, it became feasible to concentrate the light into parallel beams laterally in addition to concentrating the light into parallel beams vertically. With ordinary refractors, it was not possible to uniformly distribute the light from such an ovate shaped reflector into four separate uniformly lighted areas.

The problems with which this invention is concerned arise from the utilization of a refractor which produces four light beams when used in combination with a light source and reflector which initially produces two laterally directed reflected beams.

When two beams from the reflector are split by means of vertical, contiguous light splitting prisms layed out along the length of the refractor sides into two other beams each, the four beams fall onto the street at vertical angles depending entirely upon the geometry of the situation. If it is necessary to lower these beams, basic horizontal outside prisms are used. Where it is desired to raise the reflected and split light, basic inside horizontal prisms may be required. As refractors of the type described use inside vertical, contiguous light splitting prisms layed out substantially along the length of the refractor sides, the system of basic horizontal prisms, also on the inner surfaces of the refractor sides, must act independently of the inside vertical light splitting prisms.

Vertical treatment of the two reflected beams becomes a rather serious problem when, as today, the luminaire utilizing the two way reflector is tilted upwardly, usually about 10°, over the roadway. When such a reflector is so tilted, the resultant reflector beams fall onto the street at an inclined angle and when these reflector beams are split and directed into the four streets of an intersection, they also fall on the streets peculiarly and asymmetrically at an inclined angle with respect to the axes of the streets. According to the geometry of any given location, it may be that only one split beam on one side of the luminaire may need special treatment for spreading, smoothing or raising or lowering the light.

Where such is the case basic horizontal prisms which pass through an extended area of the refractor will not do, as they will not selectively treat only one of the beams. Thus, because the concentrated beam from the reflector is split all along the length of the refractor side by vertical, contiguous light splitting prisms and a horizontal prism which crosses such prisms will effect vertical treatment of the light emitted into both lateral directions by the two active surfaces of each of the splitting prisms.

Accordingly, it is an object of this invention to provide an improved luminaire construction.

A further object of this invenion is to provide a luminaire including a reflector for concentrating two light beams laterally and including a refractor positioned to receive the light beams and to split each concentrated beam into separate lighted areas for illuminating a four-way street intersection.

A further object of the invention is to provide a refractor including prism means for splitting a laterally concentrated beam of light and for directing the light into separate uniformly lighted areas therebeneath.

A further object of the invention is to provide a luminaire which is simple in design, rugged in construction and economical to manufacture.

It is yet a further object of the invention to provide inside horizontal prisms in a four way refractor of the type described for raising or otherwise vertically treating the reflected light.

It is another object of the invention to provide horizontal prisms in a four way refractor of the type described for raising the reflected light into higher angles.

It is one of the principal objects of this invention to selectively treat one or more of the four beams emitted by a four way refractor of the type described for effecting vertical light distribution in the selected beam or beams.

Yet another object of the invention is to provide a light splitting prism having one of its active surfaces constructed for effecting redirection of light longitudinally thereof.

In carrying out these and other apparent objects, the present invention provides a refractor which is used with an ovate type reflector and is capable of accepting two laterally concentrated beams from the reflector and transforming these beams into another two which are directed into a respective street of a four-way street intersection in order to light the area uniformly. The present invention includes prism means for splitting each of the two reflected beams into two uniformly lighted separated areas. The refractor portion of the luminaire includes means for lifting or depressing the split beams for proper orientation on the street, and for effecting emergence of light from the refractor at efficient angles.

The invention further provides the improvement, in a refractor having its side substantially covered by vertical, horizonally contiguous prisms each having two active surfaces receiving the concentrated beams of light from a reflector and refracting each beam by splitting the same into two concentrated, and laterally diverging beams on either side of the luminaire, of horizontal inside prisms for vertically treating the emitted beams. In such a refractor, where raising the beams is the desired result, the horizontal light splitting prisms are physically superimposed directly upon the active surface of each vertical prisms. Where selective treatment of one beam on a side of the refractor is desired, and this could include the treatment of only portions of the single beam, the horizontal prisms are superimposed directly upon only one of the active surfaces of each vertical prism which extends in the area of the refractor side emitting light into the area of the beam to be treated.

It can be appreciated that various types of prisms for changing the configuration of one of the usually flat incident surfaces of a vertical light splitting prism into a surface for vertical treatment of light, may be employed to solve different lighting problems. For example, short horizontal light splitters may be found on the particular beam surfaces of a plurality of the vertical light splitters to effect a vertical spread of light; or short horizontal light lifting prisms may be employed to raise one beam on either side of the luminaire. In any instance, where vertical treatment of only one of two beams split from a single concentrated reflected beam is desired, only one side of each of the main light splitting prisms is to be used.

The invention, its objects and applications will be best understood upon a reading of the following specification taken in conjunction with the accompanying drawings in which.

Figure 1:
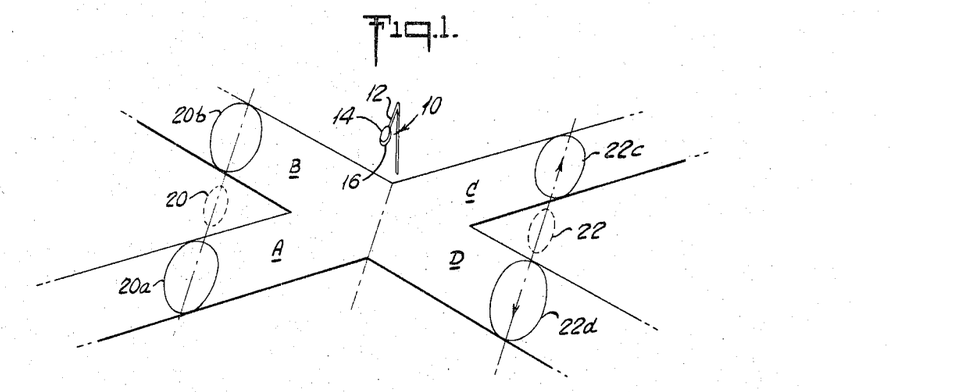
FIG. 1 is a perspective view of a four-way street intersection indicating the light pattern produced by a pole mounted luminaire constructed in accordance with the invention.

Referring to the drawings in particular, the invention as embodied therein includes a luminaire generally designated 10 which is mounted on a pole 12 on a corner of an intersection of four streets A, B, C and D.

Figure 8:
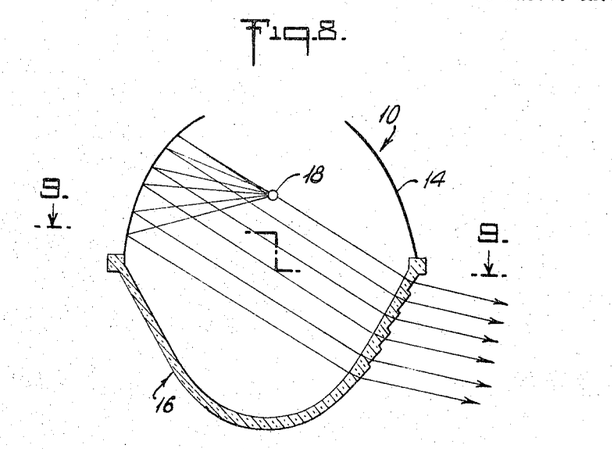
FIG. 8 is a view similar to FIG. 7 but indicating the reflector in position over the refractor and indicating another embodiment of an outside prism construction for elevating the light and indicating the light ray path therefor.
Figure 9:
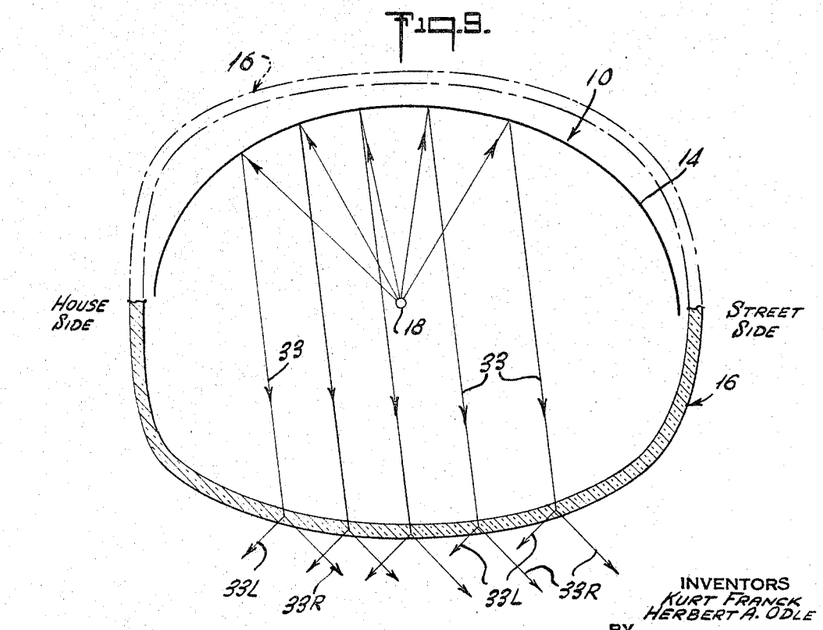
FIG. 9 is a horizontal section of the luminaire taken on the line 9—9 of FIG. 8.

In accordance with the invention, the luminaire includes an ovate shaped reflector 14, the mouth of which is closed by a refractor generally designated 16 (FIGS. 8 and 9). The luminaire includes a light source 18 which is located within the reflector 14 at a location to reflect rays of light from each side of the reflector into substantially parallel light rays which without the refractor 16 would be directed into a light beam concentrated laterally on each side of the luminaire as at 20 and 22 in FIG. 1.

In accordance with the invention, when the refractor 16 is positioned on the luminaire the beams 20 and 22 are split into two evenly illuminated beams 20a, 20b and 22c, 22d, respectively (FIG. 1). To accomplish this, rectangular areas 24, 26 and 28 on each substantially vertical side face of the refractor are provided with a multiplicity of vertical rows of prisms 29 on the inside face which act on the concentrated light beams 20 and 22 and deflect them laterally into the beams 20a and 20b and 22c and 22d. The prisms in the areas 28 adjacent the street side of the refractor are sloped slightly differently from the other two areas in order to direct the light into desirable areas of the streets A and D.

The outside faces of the refractor opposite the areas 24 and 28 are provided with a plurality of rows of vertical prisms 30 which are superimposed on rows of horizontal prisms 32. The horizontal prisms 32 extend completely along the areas 24, 26 and 28, but on the outside portions of the refractor. The outside horizontal prisms 32 are provided for lifting (FIG. 8) or depressing (FIG. 6) the split beams 20a and 20b and 22d and 22c, and for the purposes of properly orientating these beams on the streets A, B, C and D. The superimposed vertical prisms 30 located on the outside surface in opposition to the areas 24 and 28 are provided to make the emergent light angle more efficient than would normally be the case. In the sections 24 and 28 the beam of light would normally strike the outside surface of the refractor at an inefficient angle, however, the near vertical outside prisms cooperate with the inside splitting prisms to insure that the light emerges at more efficient angles.

Figures 4, 5, 6:
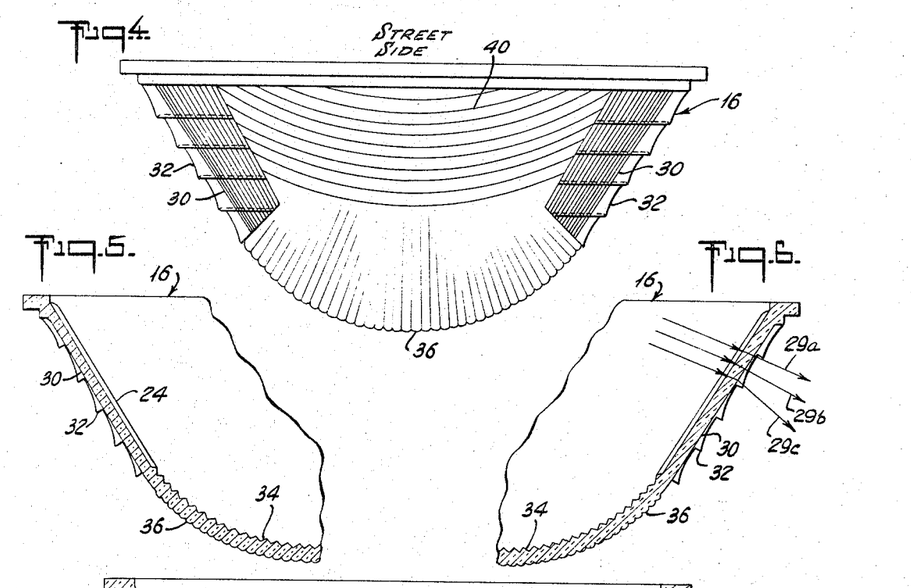
FIG. 4 is an end elevation of the refractor indicated in FIG. 2.
FIG. 5 is a fragmentary vertical section taken on the line 5—5 of FIG. 3.
FIG. 6 is a fragmentary vertical section taken on the line 6—6 of FIG. 3 and indicating the downward bending of light rays by the refractor.
Figure 7:
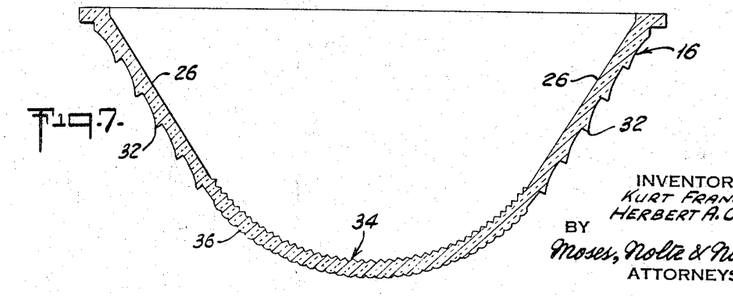
FIG. 7 is a vertical section taken on the line 7—7 of FIG. 3.

In FIG. 6 the actions of the outside horizontal prisms 32 on parallel light rays 29a, 29b and 29c are indicated. In this instance the prisms are chosen to depress the light into the desired street areas. The ray 29a exits at the top narrow portion of the prism row 32 and is not bent to any appreciable extent. The ray 29b is bent downwardly slightly and 29c is bent downwardly to a greater extent at its location emerging from the bottom of the horizontal prism row 32, since the widened portions of these prisms are more effective. The overall effect of the horizontal prisms 32 is to depress the light rays into the desired street areas. However, prisms may be chosen to elevate this light where the street area to be lighted requires this.

FIG. 8 indicates how the light rays 19 are elevated by the action of an elevating set of horizontal prisms similar to the prisms 32. The action of the interior vertical prisms 29 is indicated in FIG. 9 in which reflected light rays 33 are split into two emergent light rays 33l and 33r.

Thus, it will be seen that the downwardly converging sides of the refractor carry at the exterior of the refractor a prism means which in integral with these sides of the refractor and which serves to determine the inclination of the light beams. The prism means carried by each of these downwardly converging sides of the refractor is in the form of the vertical row of horizontally extending prisms 30 at each side of the refractor. As is apparent from FIGS. 4–8, each of these horizontally extending prisms has an upper edge which is located more distant from the longitudinal central plane of the refractor than its lower edge, and furthermore each horizontally extending prisms has an upper edge which is located more distant from the longitudinal central plane of the refractor than its lower edge, and furthermore each horizontally extending prism 30 is situated nearer to the longitudinal central vertical plane of the refractor than the next higher prism 30 with the upper edge of each prism 30 displaced with respect to the lower edge of the next higher prism 30 so as to provide a stepped configuration for the vertical row of horizontally extending prisms. In the case of FIG. 6 where these prisms serve to bend the light downwardly, the upper edge of each horizontal prism 30 is situated nearer to the longitudinal vertical central plane of the refractor than the lower edge of the next higher prism 30, while in the case of FIG. 8 where these prisms function to raise the light the upper edge of each horizontally extending prism is situated more distant from the longitudinal central vertical plane of the refractor than the lower edge of the next higher prism 30.

Figure 2:
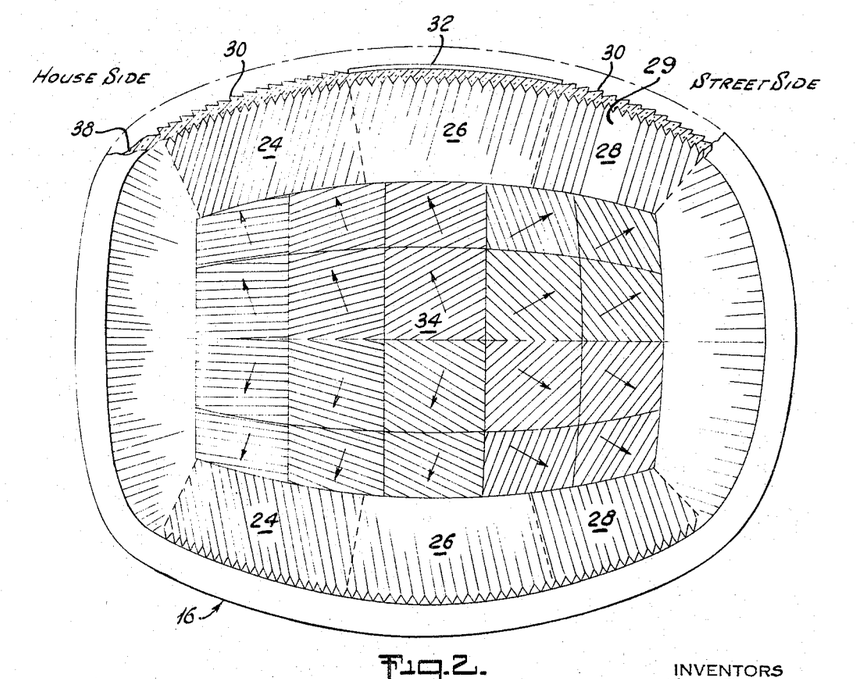
FIG. 2 is a top plan partially in section of a refractor constructed in accordance with the invention.
Figure 3:
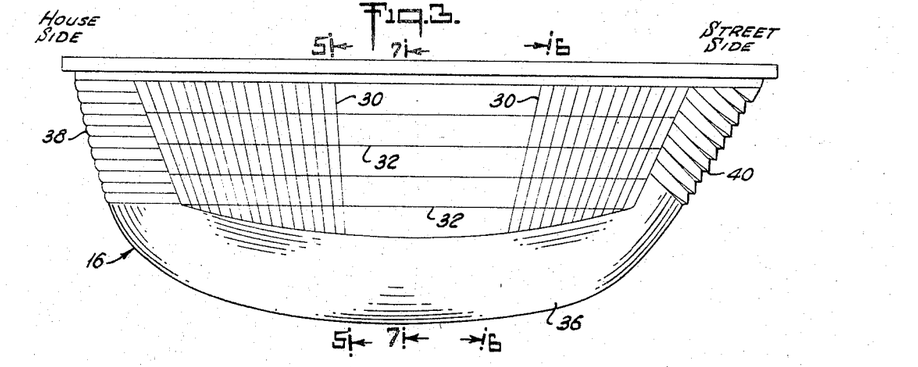
FIG. 3 is a side elevation of the refractor indicated in FIG. 2.

In order to achieve substantially uniform lighting between the beams 20a, 20b, 22c and 22d on the streets A, B, C and D, the refractor 16 is provided with an enlarged substantially rectangular bottom section 34 which is subdivided into a plurality of smaller substantially rectangular panels as indicated in FIG. 2, in order to achieve the light directing as indicated by the arrows in this figure. Each of the small panels of the rectangular area 34 are provided with rows of prisms on the interior surface located and constructed to give the general direction of light throw indicated by the arrows. Smoothing out from one panel to the next is accomplished by the provision of external curved flutes 36 running the length of the bottom portion of the refractor. These flutes 36 are provided to reduce glare which may result between the rows of prisms and at the apices of the prisms on the interior face of the refractor. Similar flutes 38 are provided at the outside on the house side end of the refractor whereas prisms 40 are provided at the street side end of the refractor to refract high angle light downwardly and reduce glare. The lighting characteristics produced by each of the house side and street side ends of the refractor form no part of the present invention and hence are not described in detail.

Thus, the invention provides a luminaire which is capable of lighting remote beam areas in each of four intersecting streets and includes means for evenly distributing the light from the location of the luminaire to the lighted beam areas.

Figures 13, 14, 15, 16, 17, 19:
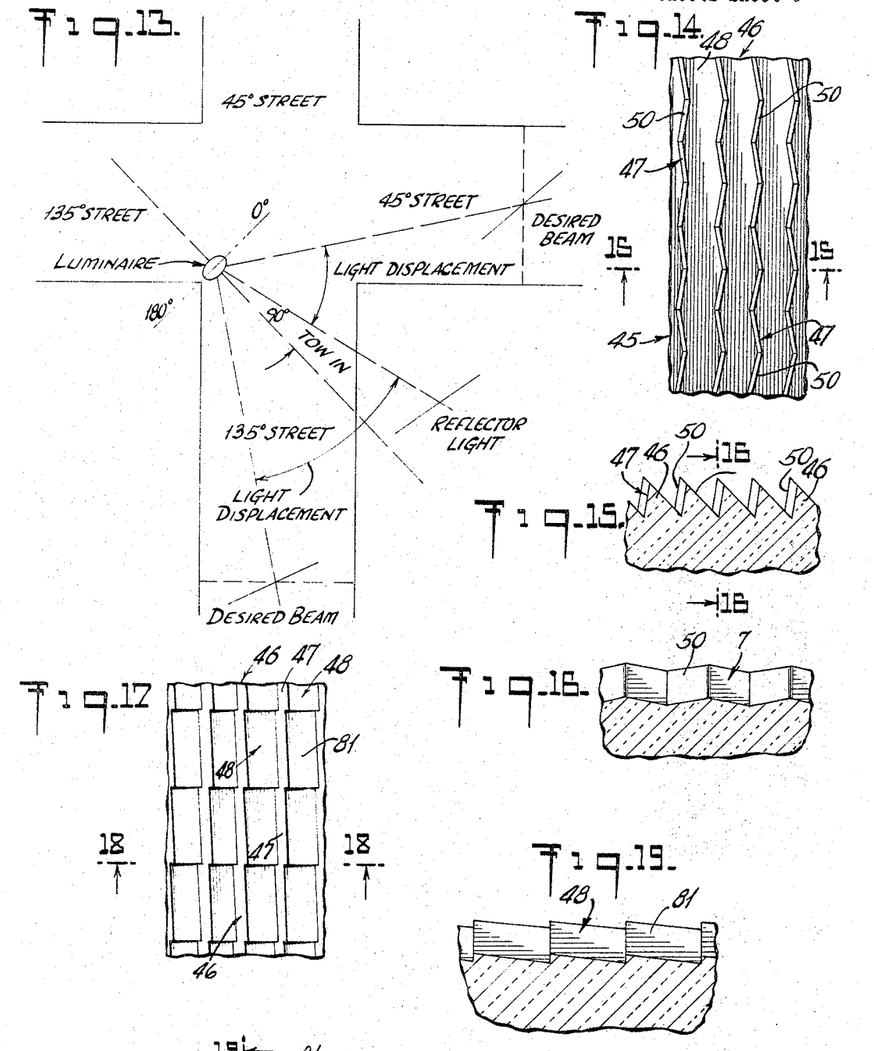
FIG. 13 is a plan view of a four way street intersection indicating the light patterns produced by a pole mounted luminaire reflector and with a reflector-refractor combination where the luminaire is tilted upwardly toward the street side and without utilizing the construction of the invention.
FIG. 14 is a plan view of a fragment of a refractor side as may be utilized in area 57 of the refractor shown diagrammatically in FIG. 10 and is represented as taken along the line 14—14 of FIG. 10.
FIG. 15 is a sectional view taken along the line 15—15 of FIG. 14.
FIG. 16 is a sectional view taken along the line 16—16 of FIG. 15.
FIG. 17 is a plan view of a fragment of a refractor side as may be utilized in area 80 of the refractor of FIG. 11 and is represented as taken along the line 17—17 of FIG. 11.
FIG. 19 is a sectional view taken along the line 19—19 of FIG. 18.
Figure 18:
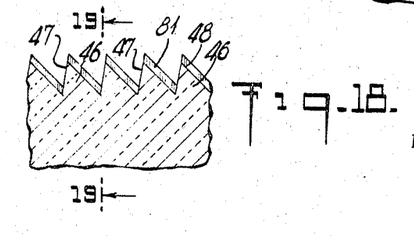
FIG. 18 is a sectional view taken along the line 18—18 of FIG. 17.

Given the situation illustrated in FIG. 13, where the pole mounted luminaire is tilted upwardly to the far corner of the intersection; and that is, along the 0–180° axis of the luminaire, the basic reflected beams, instead of being sent along the 90–270° axis, will fall closer to the 45° street and at an inclined angle, towed in quite considerably toward the 45° street. Resultingly the light displacement of the beam to the 45° street is shorter than that of the beam to the 135° street. Similarly, when a four way refractor is used to split the reflected beam in two, the path of a good portion of the light to the actual beam in the 45° street will fall short of the desired beam area (outwardly of the dash line) and will be shorter than that to the 135° street so that the candlepower obtained in the 45° street will be considerably higher. Thus, FIG. 13 shows the refracted beam in the 45° street to be quite slanted toward the length of the street while the refracted beam in the 135° street is more nearly conformable to the desired lateral beam spread.

In order to reduce the candlepower of the 45° street beam, the invention contemplates treating a large area of the house side of the refractor side to spread the light, which falls closest to the luminaire, longitudinally of the 45° street.

In the following discussion, for convenience, portions of concentrated beams of light will be referred to and depicted in the drawing as single rays, such as $R_1$–$R_4$, H, $H_1$, S and $S_1$. Also, for convenience, the basic vertical light splitting prisms will be indicated by the number 46 in each embodiment of the invention.

Figure 10:
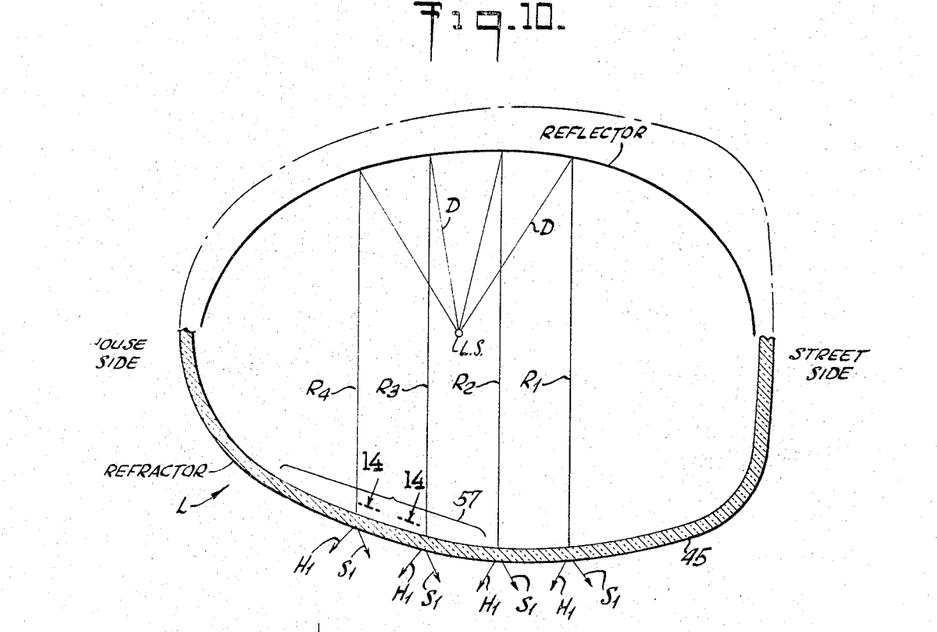
FIG. 10 is a diagrammatic sectionalized view of an outdoor luminaire taken in horizontal planes along the line 10—10 in FIG. 10A, and showing the lateral light distribution of a concentrated reflected beam through the side of a four way refractor constructed in accordance with the invention.
Figures 10A, 10B, 10C:
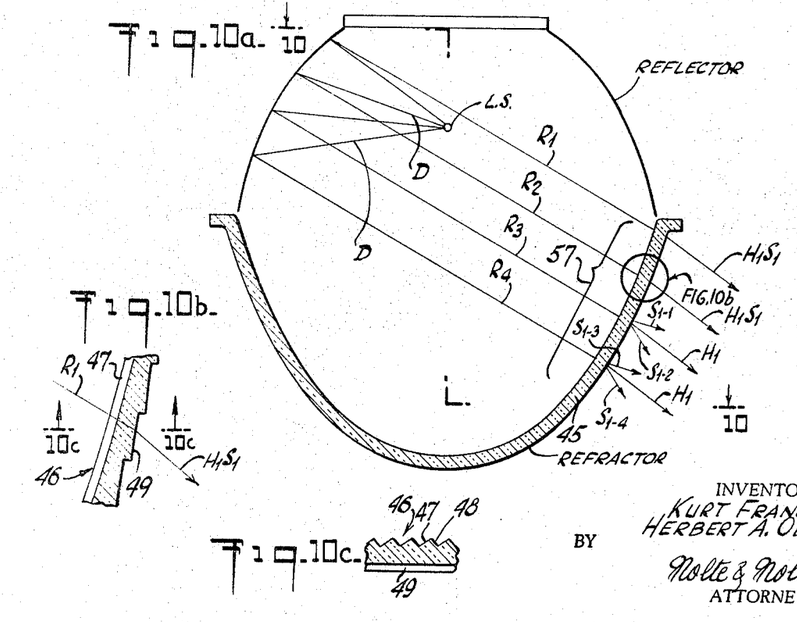
FIG. 10A is a diagrammatic sectionalized view taken in vertical planes through the refractor of FIG. 10, and showing the vertical light distribution of the concentrated beam.
FIG. 10B is a sectional view of area 10B in FIG. 10A and showing the prismatic arrangement which effects the vertical light redirection through that area of the refractor.
FIG. 10C is a sectional view taken along the line 10C—10C of FIG. 10B.

Referring to FIGS. 10 and 10A, the luminaire L includes a light source LS, the direct rays of light D from which are reflected via the reflector into a concentrated beam of parallel rays $R_1$–$R_4$ on either side of the luminaire to impinge upon the refractor sides 45. The inner surface of the sides 45 of the refractor are covered from top to bottom and from house side to street side, with basic vertical light splitting prisms 46 (see FIGS. 10B and 10C) which are positioned relative to the reflected beam $R_1$–$R_4$ to receive light upon both active surfaces 47 and 48, and to split the reflected beam into two refracted beams of generally parallel rays $H_1$ and $S_1$ extending into the 135° and 45° streets, respectively, In the refractor of FIGS. 10–10C, outside light lowering prisms 49 extending horizontally along the lengths of the sides 45 of the refractor, intercept light passing through the refractor sides from the top to the bottom thereof, and are positioned relative to the paths of the beam rays to bring the reflected beams down to the desired beam angles. The rays $H_1$ emitted toward the house end of the refractor along the 135° street, fall properly into a beam pattern closely conforming to the desired beam. However, in order to spread the close light in the 45° street beam, area 57 of the refractor side 45 is provided with small horizontal vertically contiguous light splitting prisms 50 (FIG. 15) formed on surface 47 of light splitting prisms 46. These prisms 50 act to vertically spread rays $S_1$ between maximum and minimum vertical angles as may be calculated by the disposition of the surfaces of the prisms 50, along the 45° street; that is, longitudinally of both the basic light splitting prisms 46 and the street. Refer to the light distribution of rays $R_3$ and $R_4$ through the refractor side in FIG. 10A, and note that rays $S_1$ will spread rays $R_3$ and $R_4$ between the maximum and minimum vertical angles of spread traveled by rays $S_{1-1}$ and $S_{1-2}$ for ray $R_3$ and between rays $S_{1-3}$ and $S_{14-4}$ for rays $R_4$.

A similar type of distribution could be achieved with the use of small horizontal, contiguous flutes formed similarly to the light splitting prisms 50 shown most clearly in FIGS. 14–16.

Consider now, another condition, where a luminaire is not tilted over the street but is disposed more or less horizontally. It may be that the desired vertical angle of the split beams in the 45° street and in the 135° street, might not be equal; or it could be that the topography of the site to be lighted might require different vertical angles for the two split beams.

In such a case, single acting prisms (as opposed to double acting light splitting prisms in the nature of prisms 46 and 50) disposed on selected and corresponding surfaces of the basic light splitting prisms 46 may be utilized to raise, for instance, only one of the beams.

Figure 11:
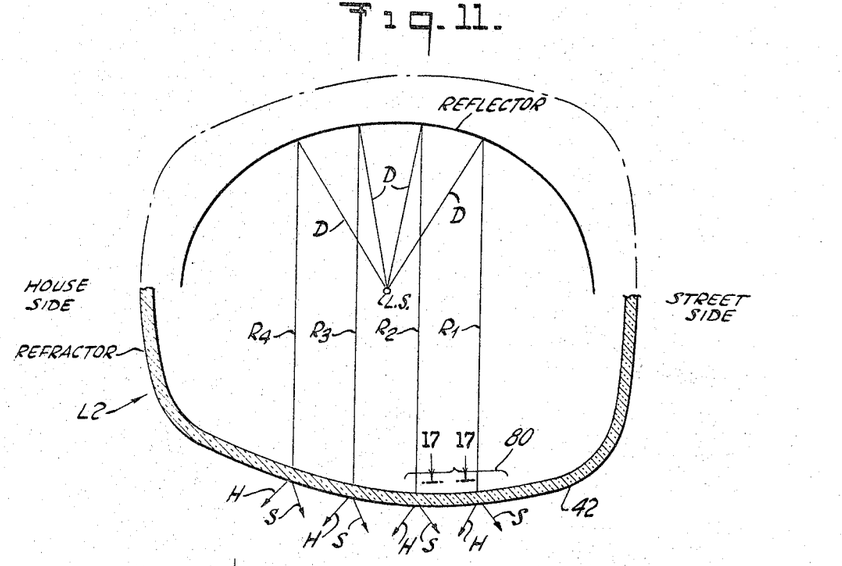
FIG. 11 is a diagrammatic sectionalized view of a second outdoor luminaire taken in horizontal planes along the lines 11—11 in FIG. 11A, and showing the lateral light distribution of a concentrated reflected beam through the side of a four way refractor also constructed in accordance with the invention.
Figures 11A, 12, 12A:
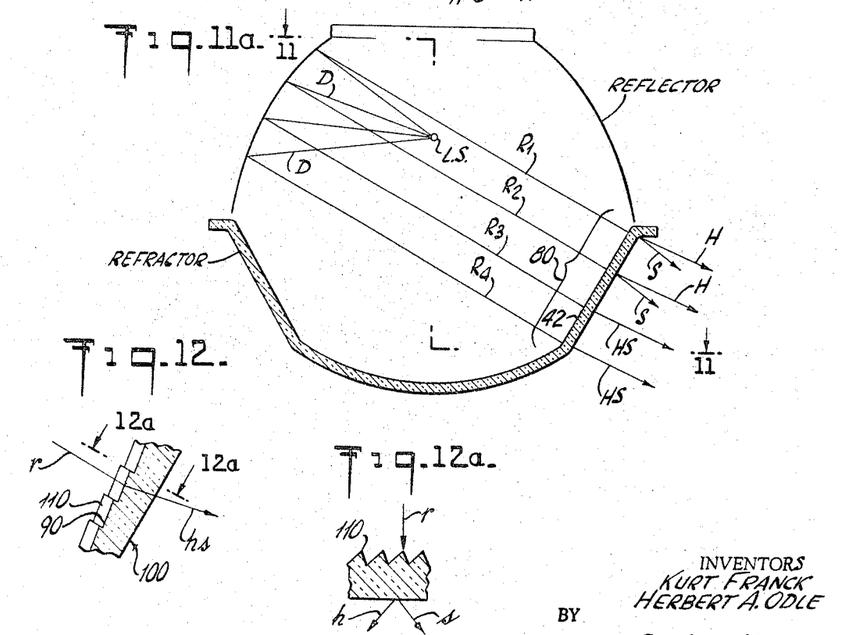
FIG. 11A is a diagrammatic sectionalized view taken in vertical planes through the refractor of FIG. 11 and showing the vertical light distribution of the concentrated beam.
FIG. 12 is a sectional view of a fragment of a refractor side and showing a prismatic arrangement for effecting the lifting of a concentrated reflected and split beam.
FIG. 12A is a sectional view taken along the line 12a—12a of FIG. 12.

In FIGS. 11 and 11A there is shown a luminaire L–2 wherein the reflector sends the direct rays D of the light source LS into a concentrated parallel beam illustrated by rays $R_1$–$R_4$, which impinges upon the sides 42 of the refractor where basic inside vertical light splitting prisms, such as prims 46, shown in FIG. 10B, cover the inner surfaces of the sides. These light splitting prisms plit the reflected beam into two refracted beams of generally parallel rays H and S extending into the 135° and 45° streets, respectively.

No basic horizontal prism is utilized to raise the reflected beams as only the beams in the 135° streets require raising in the particular situation now being discussed. As such is the case, the invention contemplates using area 80 toward the street side of the refractor side 40 within which the basic vertical light splitting prisms 46 (refer to FIG. 17) has horizontal light lifting prisms 81 disposed in vertically contiguous fashion upon the street side surfaces 48 thereof. By means of the single acting light lifting prisms 81, disposed upon surfaces 48 of light splitting prisms 46 within area 80 of the refractor side 42, the portion of the concentrated reflected beam depicted by rays $R_1$ and $R_2$ are treated differently in the 135° street in that rays H are lifted into a desired vertical angle while rays S are permitted to emit at unaltered vertical angles as best seen in FIG. 11A. Rays H and S which are emitted outside of area 80 are also permitted to emit at unaltered vertical angles. In this respect, only a portion of the reflected concentrated beam $R_1$–$R_4$ has been raised. It is clear, however, that the treatment of the entire 135° street beam can be so treated if desirable.

The invention also contemplates the provision of a basic inside horizontal prism for raising both of the split beams. In this respect reference may be had to FIGS. 12 and 12A which illustrate horizontal prisms 90 formed on the inner surface of a refractor side 100. These prisms would extend along the entire side in vertically contiguous fashion and include on their light incident surfaces light splitting prisms 110 which would receive light $r$ from the reflector and split the same into two beams consisting of rays $h$ and $s$, while these same rays $h$ and $s$ are being raised by the action of the basic horizontal prisms 90.

It is to be understood that while we have shown specific embodiments of our invention other embodiments are clearly conceivable. For example, it is distinctly possible to provide a luminaire of the type described in which no vertical redirection via outside horizontal prisms is provided.

Accordingly, we wish that our invention be defined by the appended claims.

What we claim is:

1. A luminaire comprising a reflector and a light source positioned within said reflector and constituting therewith means for directing two concentrated beams of substantially concentrated parallel rays of reflected light into vertically downwardly and laterally diverging directions, one beam on each side of the luminaire and extending between a pair of mutually exclusive diverging axes of a four-way intersection or the like;

means for splitting each said beam into two further beams of substantially equal luminosity and of substantially parallel rays of reflected and refracted light and for respectively directing the thus acquired four beams along the four axes of the intersection or the like;

said means for splitting said beams comprising a refractor disposed beneath said reflector and said light source and including two opposing sides positioned to constitute means for respectively receiving substantially the total light of each of said reflected beams;

said sides being substantially covered by vertically oriented light splitting prisms, each prism having a first side and a second side converging inwardly of the refractor to an apex, said first side facing toward one end of said refractor and said second side facing toward the other end of said refractor;

said first sides of all the prisms on either refractor side constituting means for receiving substantially one-half of the light from the respective reflected beam impinging on the corresponding side and for refracting the same toward said other end for forming two of said reflected and refracted beams along two of said four axes;

said second surfaces of all of said prisms on either refractor side constituting means for substantially receiving tthe other half of the light from the repective reflected beam impinging on the corresponding side and for refracting the same toward said one end for forming the other two of said reflected and refracted beams along the other two of said four axes;

and means for vertically redirecting at least one of said reflected and refracted beams, said vertically redirecting means consisting of horizontally oriented light refracting formations on only the first vertical surfaces of a plurality of adjacent light-splitting prisms on at least one of said sides of said refractor.

2. The luminaire of claim 1 wherein said horizontally oriented light refracting formations consist of vertically contiguous prisms, each having only a single surface which is active with respect to receiving and transmitting light from the reflected beam and so disposed relative to the plane of the refractor side and to the concentrated beam from the reflector to constitute means for receiving and lifting light from the portions of the reflected beam incident thereon.

3. The luminaire of claim 1, wherein said light refracting formations consist of vertically contiguous prisms, each having a pair of surfaces both of which are active with respect to receiving and transmitting light from the reflected beam, and both of which are so disposed relative to the plane of the refractor side and to the concentrated beam from the reflector to constitute means for receiving and vertically spreading light from the portions of the reflected beam incident thereon.

4. A luminaire comprising a reflector and a light source positioned within said reflector and constituting therewith means for directing two concentrated beams of substantially concentrated parallel rays of reflected light into vertically downwardly and laterally diverging directions, one beam on each side of the luminaire and extending between a pair of mutually exclusive diverging axes of a four-way intersection or the like;

means for splitting each said beam into two further beams of substantially equal luminosity and of substantially parallel rays of reflected and refracted light and for respectively directing the thus acquired four beams along the four axes of the intersection or the like;

said means for splitting said beams comprising a refractor disposed beneath said reflector and said light source and including two opposing sides positioned to constitute means for respectively receiving substantially the total light of each of said reflected beams;

said sides being substantially covered by vertically oriented light splitting prisms, each prism having a first side and a second side converging inwardly of the refractor to an apex, said first side facing toward one end of said refractor and said second side facing toward the other end of said refractor;

said first sides of all the prisms on either refractor side constituting means for receiving substantially one-half of the light from the respective reflected beam impinging on the corresponding side and for refracting the same toward said other end for forming two of said reflected and refracted beams along two of said four axes;

said second surfaces of all of said prisms on either refractor side constituting means for substantially receiving the other half of the light from the respective reflected beam impinging on the corresponding side and for refracting the same toward said one end for forming the other two of said reflected and refracted beams along the other two of said four axes; and means for vertically redirecting at least one of said reflected and refracted beams;

said one end of said refractor being the "house-side" of said luminaire and said other end of said refractor being the "street-side" of said luminaire, said reflector and refractor being of ovate contour in horizontal sections, the long axes thereof extending through the "house-side" and "street-side" of said luminaire, said reflector and refractor being tilted upwardly along the long axes and toward said "street-side," and said means for vertically redirecting at least one of said reflected and refracted beams being formed on the first vertical surfaces of a plurality of adjacent light-splitting prisms and covering only a portion of said sides toward said "house-side" of said luminaire, said last named means further comprising means for spreading light only near the "house-side" of said luminaire along an axis of said intersection or the like substantially 45° on either side of the long axes of said reflector and refractor.

5. The luminaire of claim 4 wherein said means for vertically redirecting at least one of said reflected and refracted beams comprise further light-splitting prisms, each having two surfaces which are active with respect to receiving and transmitting light from the reflected beam.

6. A street lighting luminaire refractor of substantially ovate contour in horizontal section comprising a pair of opposed sides disposed on either side of the long axis of said refractor, each said side including means for receiving substantially parallel rays of light of a concentrated beam of reflected light at lateral angles substantially normal thereto and for splitting said beam into two further beams of substantially equal luminosity and of substantially parallel rays of reflected and refracted light and for respectively directing the thus acquired two beams along axes extending substantially 45° and 135° relative to said long axis of said refractor;

each of said sides being substantially covered by vertically oriented light splitting prisms, each prism having a first side and a second side converging inwardly of the refractor to an apex, said first side facing toward one end of said refractor and said second side facing toward the other end of said refractor;

said first sides of all the prisms on either said refractor side constituting means for receiving substantially one-half of the light from the respective reflected beam impinging on the corresponding side and for refracting the same toward said other end for forming two of said further beams substantially extending along said 45° axes;

said second surfaces of all of said prisms on either refractor side constituting means for substantially receiving the other half of the light from the respective reflected beam impinging on the corresponding side and for refracting the same toward said one end for forming two of said further beams substantially extending along said 135° axes;

and means for vertically redirecting any one of said further beams, said vertically redirecting means consisting of horizontally oriented light refracting formations on only the first vertical surfaces of a plurality of adjacent light-splitting prisms on at least one of said sides of said refractor.

7. The luminaire refractor of claim 6, wherein said horizontally oriented light refracting formations consist of vertically contiguous prisms, each having only a single surface which is active with respect to receiving and transmitting light from the reflected beam and so disposed relative to the plane of the refractor side and to the concentrated beam to constitute means for receiving and lifting light from the portions of the reflected beam incident thereon.

8. The luminaire refractor of claim 6, wherein said light refracting formations consist of vertically contiguous prisms each having a pair of active surfaces both of which are active with respect to receiving and transmitting light from the reflected beam, and both of which are so disposed relative to the plane of the refractor side and to the concentrated beam to constitute means for receiving and vertically spreading light from the portions of the reflected beam incident thereon.

9. A street lighting luminaire refractor of substantially ovate contour in horizontal section comprising a pair of opposed sides disposed on either side of the long axis of said refractor, each of said side including means for receiving substantially parallel rays of light of a concentrated beam of reflected light at lateral angles substantially normal thereto and for splitting said beam into two further beams of substantially equal luminosity and of substantially parallel rays of reflected and refracted light and for respectively directing the thus acquired two beams along axes extending substantially 45° and 135° relative to said long axis of said refractor;

each of said sides being substantially covered by vertically oriented light splitting prisms, each prism having a first side and a second side converging inwardly of the refractor to an apex, said first side facing toward one end of said refractor and said second side facing toward the other end of said refractor;

said first sides of all the prisms on either said refractor side constituting means for receiving substantially one-half of the light from the respective reflected beam impinging on the corresponding side and for refracting the same toward said other end for forming two of said further beams substantially extending along said 45° axes;

said second surfaces of all of said prisms on either refractor side constituting means for substantially receiving the other half of the light from the respective reflected beam impinging on the corresponding side and for refracting the same toward said one end for forming two of said further beams substantially extending along said 135° axes;

and means for vertically redirecting any one of said further beams;

said last named means comprising horizontally oriented light refracting formations on the first vertical surfaces of a plurality of adjacent light-splitting prisms on at least one of said sides of said refractor;

said light refracting formations consisting of vertically contiguous prisms constituting means for receiving and vertically spreading light from the portions of the reflected beam incident thereon;

said one end of said refractor being the "house-side" of said luminaire and said other end of said refractor being the "street-side" of said luminaire, said refractor being of ovate contour in horizontal sections, the long axis thereof extending through the "house-side" and "street-side" of said luminaire, said refractor being tilted upwardly along the long axis and toward said "street-side" and said means for receiving and vertically spreading light being formed on the first vertical surfaces of a plurality of adjacent light-splitting prisms which cover only a portion of said sides toward said "house-side" of said luminare, said last-named means further comprising means for spreading light only near the "house-side" of said luminaire along axes of an intersection or the like substantially 45° on either side of the long axis of said refractor.

10. The luminaire refractor of claim 9 wherein said means for receiving and spreading light vertically comprise further light-splitting prisms, each having two surfaces which are active with respect to receiving and transmitting light from the reflected beam.

11. In a luminaire of the type for positioning above a street and including a substantially ovate reflector facing downwardly with the longitudinal axis thereof extending outwardly over the street, a light source disposed in and under said reflector and producing therewith two concentrated reflected beams of light, each beam consisting of substantially parallel rays of reflected light extending vertically and laterally downwardly and forwardly of the luminaire, one beam on each side thereof, and an ovate refractor mounted below the light source and reflector and having sides oriented with respect to the vertical for intercepting the reflected beams, converging downwardly from the top of said refractor to a bottom portion extending between the lower edges of said sides, and extending from one end of said refractor to the other, said bottom portion being horizontally oriented for intercepting direct light from the light source and substantially downwaridly drected light from the reflector; the improvement comprising vertically oriented prisms covering said sides at the interior of said refractor from end to end and extending from the top of said sides to said bottom portion, each of said prisms having two active surfaces facing into one of the concentrated reflected and substantially downwardly directed light from the reflector; said prisms on either side of said luminaire dividing the entire reflected beam impinged thereon into two separate beams extending in diverging paths, and each consisting of substantially parallel rays of reflected and refracted light, and prism means carried by said downwardly converging sides of said refractor at the exterior thereof for determining the inclination of said reflected and split beams, said prism means being integral with said downwardly converging sides of said refractor and including at each of said sides a vertical row of horizontally extending prisms each of which is situated nearer to a longitudinal central vertical plane of said refractor than the next higher one of said vertical row of horizontally extending prisms, and each of said latter prisms having an upper edge situated more distant from said longitudinal central vertical plane than its lower edge with the upper edge of each horizontally extending prism displaced with respect to said longitudinal central vertical plane from the lower edge of the next higher prism to form from said vertical row of horizontally extending prisms a stepped configuration at the exterior of each of said downwardly converging sides of said refractor.

12. In the luminaire of claim 11 wherein said bottom portion of said refractor is of substantially rectangular form and is formed with a plurality of contiguous panels, each panel being formed with inside prisms extending throughout their respective panels and diagonally relative to a longitudinal median plane through said ovate refractor, the prisms of said panels adjacent the ends of said refractor and contiguous to the sides thereof having active surfaces which receive direct light from the light source and direct the same into the direction of the diverging beams from the respective contiguous sides.

13. In the luminaire of claim 11, wherein substantially rectangular areas extend from the ends of the refractor sides toward the transverse center thereon on both said sides and from the topmost edge to the bottom portion thereof and are horizontally spaced from one to the other on their respective refractor sides, said areas being formed on the outside of said refractor with vertically extending and horizontally contiguous prisms physically superimposed upon the outer active surfaces of said horizontally extending prisms, said vertical prisms superimposed upon said horizontally extending prisms having active surfaces disposed relative to the reflected and divided beam to laterally direct said two separate beams in said diverging paths.

14. In the luminaire of claim 13, wherein said bottom portion of said refractor is of substantially rectangular form and is formed with a plurality of contiguous rectangular panels, each panel being formed with inside prisms extending throughout their respective panels and diagonally relative to a longitudinal median plane through said ovate refractor, the prisms of said panels adjacent the ends of said refractor and contiguous to the sides thereof having active surfaces which receive direct light from the light source and direct the same into the direction of the diverging beams from the respective contiguous sides.

15. In the luminaire of claim 14, wherein the diagonally extending prisms near either end of said refractor extend outwardly relative to the longitudinal median plane of said refractor and toward said sides and toward the transverse median plane of said refractor.

16. In the luminaire of claim 11, said upper edge of each horizontally extending prism of said vertical row of prisms at each downwardly converging side of said refractor being situated nearer to said longitudinal central vertical plane of said refractor than the lower edge of the next higher horizontally extending prisms of said vertical row of prisms, so that said vertical row of horizontally extending prisms at each side of said refractor acts to bend the light downwardly.

17. In the luminaire of claim 11, said upper edge of each horizontal prism of said vertical row of horizontally extending prisms at each downwardly converging side of said refractor being situated from said longitudinal central plane of said refractor by a distance greater than the lower edge of the next higher horizontally extending prism of said vertical row, so that said vertical row of horizontally extending prisms at each downwardly converging side of said refractor acts to bend the light upwardly.

18. In the luminaire of claim 16, wherein horizontal prisms are superimposed upon selected active surfaces of said interior vertically oriented prisms and constitute means for vertically redirecting at least a portion of the beam refracted thereby.

19. In the luminaire of claim 17, wherein horizontal prisms are superimposed upon selected active surfaces of said interior vertically oriented prisms and constitute means for vertically redirecting at least a portion of the beam refracted thereby.

20. In the luminaire of claim 18, wherein vertical prisms are superimposed upon said exterior horizontally extending prisms and constitute means for laterally redirecting light refracted by said horizontally extending prisms.

21. A luminaire comprising an ovate reflector and a extended light source positioned within said refractor and extending substantially parallel with the long axis thereof and substantially within a common vertical plane therewith and constituting therewith means for directing two concentrated beams of substantially concentrated parallel rays of reflected light into vertically downwardly and laterally diverging directions, one beam on each side of the luminaire and extending between a pair of mutual exclusive diverging axes of a four-way intersection or the like;

means for splitting each said beam into two further beams of substantially equal luminosity and of substantially parallel rays of reflected and refracted light and for respectively directing the thus acquired four beams along the four axes of the intersection or the like;

said means for splitting said beams comprising an ovate refractor disposed beneath said reflector and said light source, the long axis of said refractor extending substantially parallel with the long axis of said reflector and substantially within a common plane therewith, said refractor including two opposing sides extending on either side of the long axis thereof and from the street-end to the house-end of said refractor and positioned to constitute means for respectively receiving substantially the total light of each of said reflected beams;

said sides being substantially covered from one said end of said refractor to the other said end by vertically oriented light splitting prisms, each prism having a first side and a second side converging inwardly of the refractor to an apex, said first side facing toward one end of said refractor and said second side facing toward the other end of said refractor;

said first sides of all the prisms on both refractor sides constituting means for receiving substantially one-half of the light from the respective reflected beam impinging on the corresponding sides from one end of said refractor to the other and for refracting the same toward said other end for forming two of said reflected and refracted beams along two of said four axes;

said second surfaces of all of said prisms on both refractor sides constituting means for substantially receiving the other half of the light from the respective reflected beam impinging on the corresponding sides from one end of said refractor to the other and for refracting the same toward said one end for forming the other two of said reflected and refracted beams along the other two of said four axes.

References Cited

UNITED STATES PATENTS

| | | | |
|---|---|---|---|
| 2,566,126 | 8/1951 | Franck | 240—106 |
| 2,814,723 | 11/1957 | Franck et al. | 240—106 |

NORTON ANSHER, *Primary Examiner.*

C. C. LOGAN, C. R. RHODES, *Assistant Examiners.*